Sept. 6, 1927.

D. BROWN 1,641,472

SPRING SUSPENSION FOR VEHICLES

Filed Sept. 29, 1926

3 Sheets-Sheet 1

Inventor
DONALD BROWN,

Attorneys

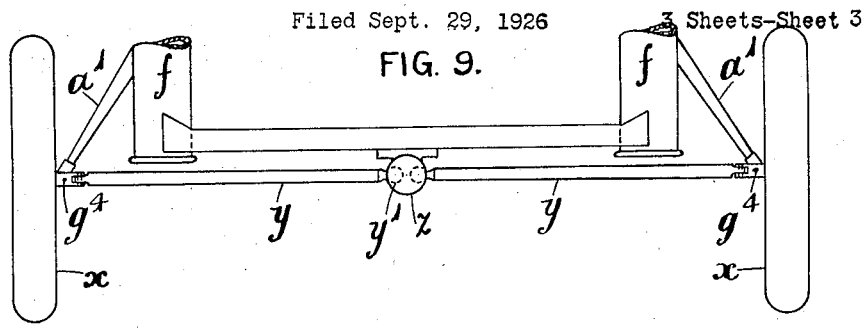
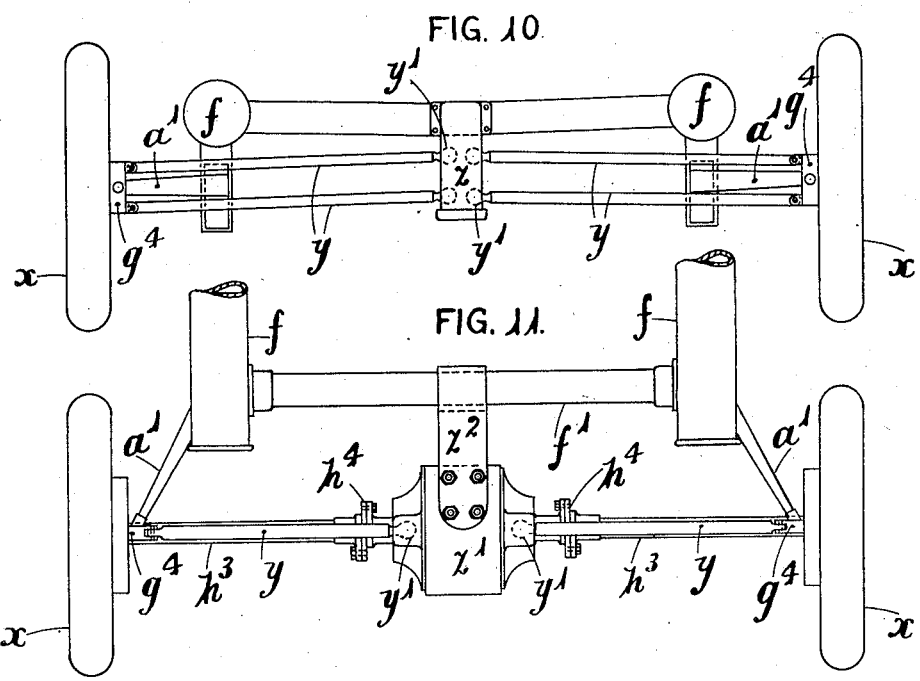

Patented Sept. 6, 1927.

1,641,472

UNITED STATES PATENT OFFICE.

DONALD BROWN, OF NEWCASTLE-UPON-TYNE, ENGLAND.

SPRING SUSPENSION FOR VEHICLES.

Application filed September 29, 1926, Serial No. 138,468, and in Great Britain August 13, 1925.

This invention relates to spring suspensions for motor and other road vehicles, and has particular reference to spring suspensions of the kind having a spiral load-carrying spring and a rebound spring horizontally supported in opposition within each end of a tubular member of the vehicle frame disposed on each longitudinal side thereof, connections being provided between the springs and a series of rockers interposed between the wheel axles and the frame in such a manner that the vertical movements of the wheel axles due to road shocks are transmitted to the springs longitudinally of the frame.

The object of the present invention is to provide an improved and simplified construction of spring suspension of the kind above referred to.

In a spring suspension in accordance with my invention I employ front and rear pairs of rockers, each rocker comprising a cranked lever journalled in a hanger rigidly suspended from the adjacent end of a longitudinal tubular member of the vehicle frame, the free ends of the normally horizontal arms of the front and rear pairs of rockers being attached to the front and rear axle respectively of the vehicle, and the free ends of the normally upwardly extending arms of said rockers co-acting with heads disposed in the frame members and simultaneously acted upon by the load springs and rebound springs therein, whereby the vertical movements of the axles due to road shock are transmitted to said springs. The load and rebound springs are compressed, when fitted, to a load approximately equal to the sprung weight of the vehicle.

Figure 1:
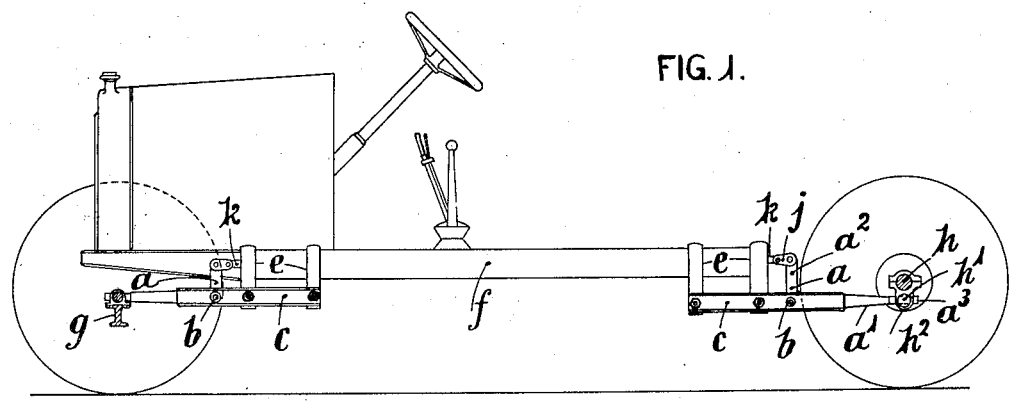
Figure 2:
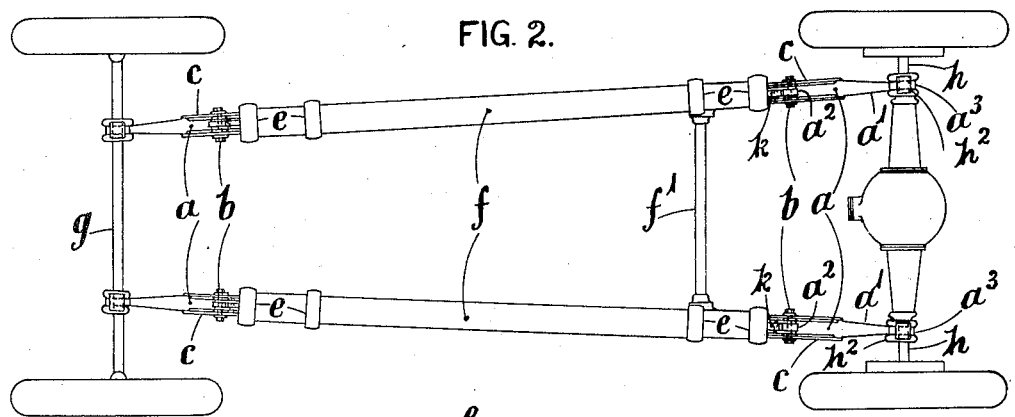
Figure 3:
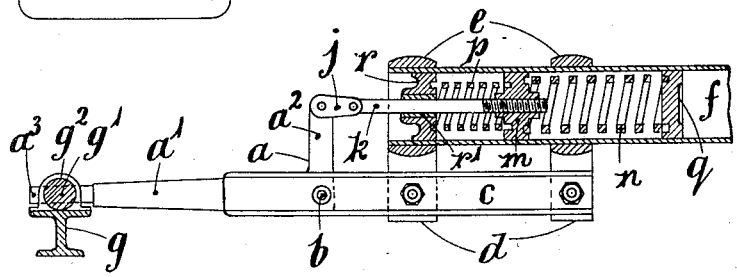
Figure 4:
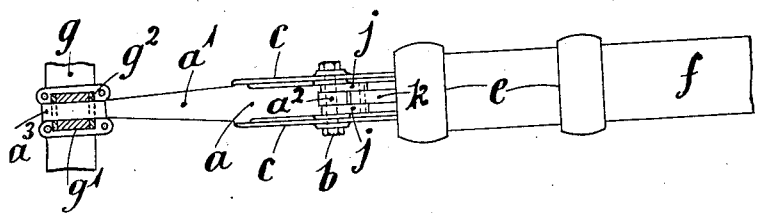
Figure 5:
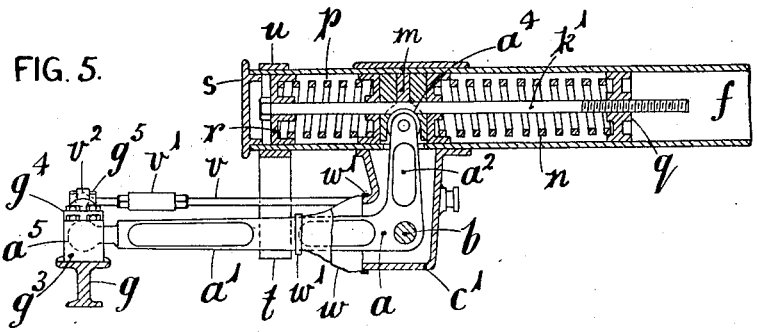
Figure 6:
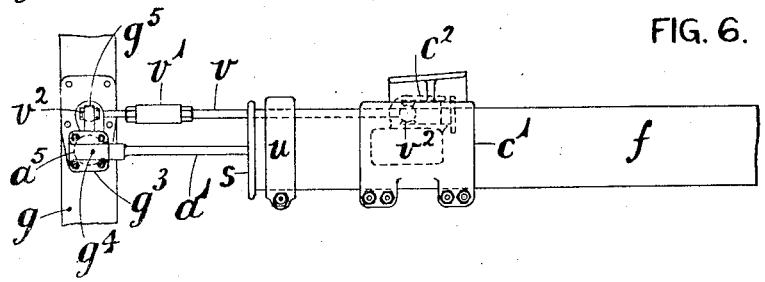
Figure 7:
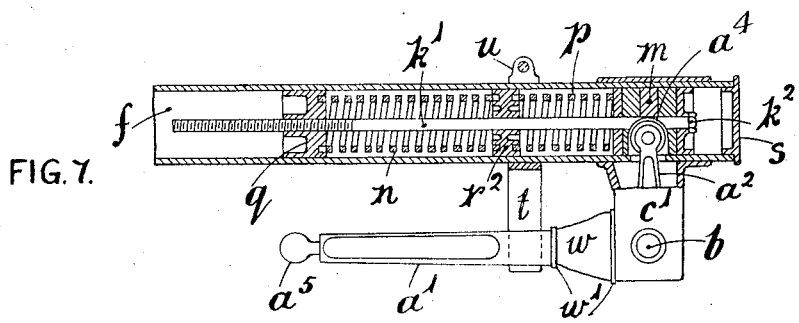
Figure 8:
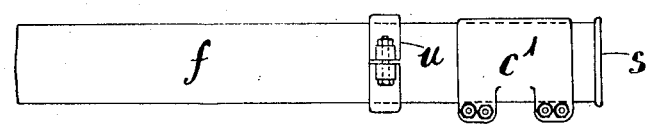

I will further describe my invention with reference to the accompanying drawings wherein Figure 1 is a side elevation and Figure 2 a plan of a motor road vehicle frame fitted with a spring suspension in accordance therewith, Figure 3 is a sectional elevation, to a larger scale, of the forward end of one of the longitudinal frame members thereof and the associated parts, and Figure 4 is a plan of Fig. 3. Figures 5 and 6 are similar views to Figs. 3 and 4 illustrating a modified construction, and Figures 7 and 8 are a sectional elevation and plan respectively of the rear end of a longitudinal frame member illustrating a further modification. Figure 9 is a plan and Figure 10 an end elevation of an alternative method of mounting the front wheels of the vehicle; and Figures 11 and 12 are similar views showing the same method applied to the rear wheels thereof.

Referring first to Figs. 1 to 4 of the said drawings, in the construction therein illustrated, I employ four rockers $a$, two at the front and two at the rear, each rocker comprising a cranked lever journalled at $b$ between a pair of channels $c$ rigidly suspended by bars $d$ depending from collars $e$ fixed around the adjacent end of the tubular longitudinal member $f$ of the frame. The normally horizontal arm $a^1$ of each front rocker terminates in a pin $a^3$ which extends through and is free to rotate in a cylindrical block $g^1$ which, in turn, is free to rotate in a keep $g^2$ secured on the front axle $g$, and the normally horizontal arm $a^1$ of each rear rocker terminates in a pin $a^3$ which extends through and is free to rotate in a cylindrical block $h^1$ which, in turn, is free to rotate in a keep $h^2$ secured on the rear axle $h$ (Figs. 1 and 2), said connections being equivalent to universal joints, the keeps $g^2$ and $h^2$ being slotted to allow movement of the axles $g$ and $h$ about the pivots $b$ and about the pins $a^3$. The normally upright arm $a^2$ of each rocker, both front and rear, is pivotally connected by a link $j$ to a push rod $k$ co-axial with the frame member $f$ and extending thereinto. The rod $k$ is fitted at its inner end with a head $m$ (Fig. 3) interposed between the adjacent ends of the load spring $n$ and the rebound spring $p$ disposed within the frame member $f$, the other ends of said springs bearing on abutments $q$ and $r$ respectively fixed in the member $f$.

It will be seen that, on the axle $g$ or $h$ rising under road shock, the rockers $a$ oscillate about their pivots $b$ and transmit the vertical movement of the axle through the links $j$ and rods $k$ to the head $m$ as an inward horizontal push which is absorbed by the load spring $n$, any rebound being absorbed by the spring $p$.

The tubular side members $f$ are preferably straight throughout their length, but need not be parallel, and are fitted with transverse tie members $f^1$ (Fig. 2), where necessary.

The upright arms $a^2$ of the rockers may be connected by links $j$ to the outer ends of the push rods $k$ as illustrated, the push rods being retained in alignment by the bushed apertures $r^1$ in the abutments $r$ in the ends of the frame members $f$ and by the co-action of their heads $m$ with the interiors of said members in which they are a good sliding fit. The heads $m$ float between the adjacent ends of the load and rebound springs $n$ and $p$. Adjustment is obtained by screwing the push rods $k$ into and out of their heads.

The tubular side members $f$ are of sufficient strength to act as the main side members of the frame and to take all torsional strains therein.

Figs. 5 and 6 illustrate a modified construction particularly designed for the front end of the vehicle, but applicable to the rear end if desired. In this arrangement, each rocker $a$ is journalled at $b$ in a hollow casting $c^1$ rigidly depending from the frame member $f$, and the upper end of the upright arm $a^2$ of the rocker co-acts directly with the head $m$ which is recessed to receive it. If desired, the arm $a^2$ may be fitted with a roller $a^4$ as shown. The head $m$ is interposed between the load spring $n$ and the rebound spring $p$, and, in this example, slides freely over the rod $k^1$ which extends between a fixed abutment $r$ and an adjustable abutment $q$ within the member $f$. The central rod $k^1$ is threaded at its inner end and the aperture in the abutment $q$ through which it passes is similarly threaded so that, by revolving said rod, the abutment $q$ can be adjusted in the member $f$ to adjust the tension of the load and rebound springs. $s$ is a cap closing the end of the frame member $f$, and $t$ is a forked guide depending from a collar $u$ about the end of the member $f$, said guide preventing lateral movement of the horizontal arm $a^1$ of the rocker.

Instead of terminating in a pin $a^3$, the arm $a^1$ of each rocker $a$ terminates in a ball $a^5$ which is received in a socket in a box $g^3$ on the axle $g$, said box being closed by a cover $g^4$, which arrangement constitutes a universal joint.

To ensure that the front axle $g$ rises and falls in a vertical plane and to take the torque of the front wheel brakes, two-part radius rods $v$ are fitted adjacent to each front rocker $a$, the parts of said rods being adjustably connected by turn-buckles $v^1$. The ends of each radius rod terminate in balls $v^2$ which are received in sockets $g^5$ and $c^2$ provided on the axle box $g^3$ and the casting $c^1$ respectively. The rockers $a$ and the radius rods $v$ together form a parallel link motion.

To ensure smooth and frictionless action, the tubular frame members $f$, between the abutments $q$ and $r$, and the castings $c^1$ are filled with lubricant, the lower end of each casting being closed by a flexible gaiter $w$ secured by bands $w^1$ around the end of the casting and around the arm $a^1$ of the rocker.

It will be seen that the springing of the vehicle does not depend upon frictional damping, friction between the springs $n$ and $p$, the heads $m$ and the arms $a^2$ of the rockers beings practically eliminated.

To avoid excessive projection of the tubular frame members $f$ at the rear of the vehicle, the head $m$ and load and rebound springs $n$ and $p$ at the rear end of each member may be arranged as shown in Figs. 7 and 8, where it will be seen that the rebound spring $p$ is disposed within the frame member $f$ between the head $m$ and a fixed abutment $r^2$ through which the central rod $k^1$ slides, and the load spring $n$ is arranged on the inner side of the fixed abutment $r^2$ between it and the abutment $q$ which is adjustable on the rod $k^1$. In this arrangement the rod $k^1$ transmits the pressure of the load spring $n$ to the rear side of the head $m$ to which it is adjustably attached by the nut $k^2$. The inner end of the central rod $k^1$ is threaded and the aperture in the abutment $q$ through which it passes is similarly threaded so that, by revolving said rod, the abutment $q$ can be adjusted in the member $f$ to adjust the tension of the load and rebound springs.

It will be seen that, in a spring suspension according to my invention, the springs are enclosed in the tubular side members $f$ which form integral parts of the spring suspended frame of the vehicle, the push rods $k$ (Figs. 1 to 4) being co-axial with the frame members $f$, and the thrust of the arms $a^2$ of the rockers being in direct alignment with the axes of the frame members $f$.

In some cases each wheel, as distinct from each axle, of the vehicle may be separately sprung. For example as shown in Figs. 9 and 10, the arms $a^1$ of the front pair of rockers may be bent laterally outwards to an extent sufficient to allow the front wheels $x$ to swing on their usual stub axles clear of the frame members $f$ for steering purposes. In place of the usual axle, pairs of horizontal parallel radius rods $y$ attached by ball joints $y^1$ to and extending laterally from a central frame member $z$ are pivotally attached at their outer ends to the caps $g^4$ of the universal joints of the rockers so that true vertical movement of the wheels is ensured.

At the rear, as illustrated in Figs. 11 and 12, radius rods $y$ may be substituted for the usual axle casing on each side of the differential casing $z^1$, being attached by joints $y^1$ at one end to said casing and pivotally attached at the other to the caps $g^4$ of the universal joints at the ends of the rear pair of rocker arms $a^1$. The rear rocker arms $a^1$ may be bent outwards as shown, and they are attached by universal joints as hereinbefore described to the separate driving shafts $h^3$. Universal joints $h^4$ are inserted at the differential ends of the driving shafts $h^3$. In this arrangement, the differential casing $z^1$ is rigidly attached by a bracket $z^2$ to the cross member $f^1$ of the vehicle frame.

What I claim as my invention, and desire to secure by Letters Patent is:—

1. A spring suspension for a vehicle comprising a pair of longitudinal tubular frame members extending substantially the length of the vehicle, a spiral load-carrying spring and a rebound spring disposed in opposition within each end of each of said frame members, abutments for said springs within each end of each frame member, a head disposed within the end of each frame member said head being simultaneously acted upon by said springs, hangers rigidly suspended from the ends of said frame members, and front and rear pairs of rockers journalled in said hangers each rocker comprising a cranked lever, the free ends of the normally horizontal arms of the front and rear pairs of rockers being attached to the front and rear axle respectively of the vehicle and the free ends of the normally upright arms of said rockers co-acting with the heads within the frame members to transmit to said sets of springs therein the vertical movements of the axles due to road shocks.

2. A spring suspension for a vehicle comprising a pair of longitudinal tubular frame members extending substantially the length of the vehicle, a spiral load-carrying spring and a rebound spring disposed in opposition within each end of each of said frame members, abutments for said springs within each end of each frame member, a head disposed within the end of each frame member said head being simultaneously acted upon by said springs, hangers rigidly suspended from the ends of said frame members, front and rear pairs of rockers journalled in said hangers each rocker comprising a cranked lever, and universal joints at the free ends of the normally horizontal arms of the front and rear pairs of rockers attaching said ends to the front and rear axle respectively of the vehicle, the free ends of the normally upright arms of said rockers coacting with the heads within the frame members to transmit to said sets of springs therein the vertical movements of the axles due to road shocks.

3. A spring suspension for a vehicle comprising a pair of longitudinal tubular frame members extending substantially the length of the vehicle, a spiral load-carrying spring and a rebound spring disposed in opposition within each end of each of said frame members, abutments for said springs within each end of each frame member, a rod within the end of each frame member coaxial therewith one of said abutments being adjustable on said rod, a head disposed within the end of each frame member said head being disposed between the load-carrying spring and the rebound spring and sliding freely over said rod, hangers rigidly suspended from the ends of said frame members, front and rear pairs of rockers journalled in said hangers each rocker comprising a cranked lever, and universal joints at the free ends of the normally horizontal arms of the front and rear pairs of rockers attaching said ends to the front and rear axle respectively of the vehicle, the free ends of the normally upright arms of said rockers coacting directly with the heads within the frame members to transmit to said sets of springs therein the vertical movements of the axles due to road shocks.

In testimony whereof, I affix my signature.

DONALD BROWN.